(12) United States Patent
Nieminen

(10) Patent No.: US 9,426,025 B2
(45) Date of Patent: Aug. 23, 2016

(54) METHOD AND A CONTROLLER DEVICE FOR CONFIGURING A SOFTWARE-DEFINED NETWORK

(71) Applicant: TELLABS OY, Espoo (FI)

(72) Inventor: Juha-Petteri Nieminen, Espoo (FI)

(73) Assignee: CORIANT OY, Espoo (FI)

( * ) Notice: Subject to any disclaimer, the term of this patent is extended or adjusted under 35 U.S.C. 154(b) by 257 days.

(21) Appl. No.: 14/061,796

(22) Filed: Oct. 24, 2013

(65) Prior Publication Data

US 2014/0122668 A1    May 1, 2014

(30) Foreign Application Priority Data

Oct. 25, 2012    (FI) ..................... 20126105

(51) Int. Cl.
*H04L 12/24*    (2006.01)
*H04L 29/08*    (2006.01)

(52) U.S. Cl.
CPC .......... *H04L 41/0803* (2013.01); *H04L 67/32* (2013.01); *H04L 41/0893* (2013.01)

(58) Field of Classification Search
CPC . H04L 41/08; H04L 41/0803; H04L 41/089; H04L 41/12; H04L 67/32
See application file for complete search history.

(56) References Cited

U.S. PATENT DOCUMENTS

| | | | |
|---|---|---|---|
| 7,451,201 B2 | 11/2008 | Alex et al. | |
| 2004/0054769 A1 | 3/2004 | Koops et al. | |
| 2004/0117613 A1 | 6/2004 | Edmondson | |
| 2005/0198382 A1 | 9/2005 | Salmi et al. | |
| 2008/0294418 A1 | 11/2008 | Cleary et al. | |
| 2009/0077075 A1 | 3/2009 | Bent et al. | |
| 2010/0153322 A1 | 6/2010 | Mandelbaum et al. | |
| 2011/0317559 A1* | 12/2011 | Kern | H04L 45/02 370/235 |
| 2011/0320396 A1 | 12/2011 | Hunt et al. | |
| 2012/0008629 A1* | 1/2012 | Chiba | H04L 45/34 370/392 |
| 2012/0155467 A1* | 6/2012 | Appenzeller | H04L 45/54 370/392 |
| 2012/0195318 A1* | 8/2012 | Numata | H04L 41/0856 370/392 |
| 2013/0010600 A1* | 1/2013 | Jocha | H04L 43/026 370/236.2 |
| 2013/0272135 A1* | 10/2013 | Leong | H04L 41/0823 370/241 |
| 2013/0329734 A1* | 12/2013 | Chesla | H04L 45/74 370/392 |
| 2014/0247751 A1* | 9/2014 | Sonoda | H04L 41/0893 370/254 |

OTHER PUBLICATIONS

Finnish Search Report dated Aug. 19, 2013, corresponding to the Foreign Priority Application No. 20126105.

(Continued)

*Primary Examiner* — Nicholas Taylor
*Assistant Examiner* — Afroza Sultana
(74) *Attorney, Agent, or Firm* — Young & Thompson

(57) ABSTRACT

A method for configuring network elements of a software-defined network on the basis of relation data items and action policy rules is presented. Each relation data item expresses two entities and their relationship and each action policy rule expresses an event and an action to be carried out in response to the event. The method comprises deriving (301) implicit relations between the entities on the basis of the relation data items and generating (303) the configuration data for the network elements on the basis of the relation data items, the action policy rules, and the derived implicit relations. The derivation of the implicit relations and the utilization of the derived implicit relations for generating the configuration data facilitate providing automated operation.

19 Claims, 3 Drawing Sheets

(56) References Cited

OTHER PUBLICATIONS

European Search Report dated Mar. 3, 2016, corresponding to the Foreign Priority Application No. 13189470.1.

S. Amante: "Internet Engineering Task Force", Juniper Networks; Oct. 2, 2012, XP055254903, Retrieved from the Internet: URL:https://datatracker.ietf.org/meeting/85/agenda/irs-drafts.pdf * p. 26-p. 38 *.

* cited by examiner

METHOD AND A CONTROLLER DEVICE FOR CONFIGURING A SOFTWARE-DEFINED NETWORK

FIELD OF THE INVENTION

The invention relates generally to a software-defined network "SDN". More particularly, the invention relates to a method, a controller device, and a computer program for configuring one or more network elements of a software-defined network.

BACKGROUND

Software defined networking is an emerging architecture for data transfer networks. In a software-defined network "SDN", the control plane is separated from the data plane so that the control plane is implemented in one or more controller devices that can be separate from the network elements and the data plane is implemented in the network elements. The network elements can be, for example, Internet Protocol "IP" routers, multiprotocol label switching "MPLS" nodes, and/or Ethernet switches. Each network element may consist of a single apparatus or a combination of a plurality of apparatuses. Typically, the software defined networking allows for quick experimenting and optimization of switching and/or routing policies and external access to the innards of network elements that formerly were closed and proprietary.

Internet Protocol "IP" based networks were initially built based on the concept of Autonomous Systems "AS". This concept allows networks to scale and extend by connected junctions that forward packets to a reasonable next hop based on partial need-to-know information. The AS principle works much like the traditional post office service, where a postal worker in a given city does not need to know all the tenants of all the streets in another city in order to choose a reasonable next hop for a letter at hand. This approach to networking is simple, and has proven resilient and scalable. This approach has, however, a few drawbacks. It does not allow the designated destinations, or tenants with home mail-boxes, to move without changing their identity as far as the packet delivery service is concerned. The topological location of destinations, which is the network interface they are attached to, dictates their identity related to the packet delivery service. In addition, using only the basic AS principle, it is hard to specify other qualities, such as logical grouping, access control, quality of service, intermediate network processing, or to specify aspects that relate to a sequence of packets that form a flow.

Using the analogy of the postal service, the software defined networking works, for any given street location, so that all the letters from all the tenants would first be aggregated by a network element on an edge a software defined network. This network element is configured to examine the current location for each of the letter-destinations using a global lookup mechanism. Based on that global lookup and on other globally defined and globally measured considerations, such as access control or remote location load conditions, the said network element places one or more of the original letters in an additional envelope addressed to each of the street locations where the destinations currently are. It then uses the normal postal service which works like the traditional Internet Protocol "IP" to get these outer envelopes to the remote locations. This is done based on the existing and scalable hop-by-hop forwarding services. The outer letters are then opened by a remote network element and the original envelopes are delivered to the destinations.

The software defined networking is, however, not free from challenges. Some of the challenges are related to configuring the network elements and keeping the network elements configured so that they are constantly capable of carrying out the above-illustrated tasks. Therefore, there is still a need for technical solutions for configuring and updating network elements of software defined networks.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new method for configuring one or more network elements of a software-defined network on the basis of relation data items and action policy rules, each relation data item expressing two entities, i.e. a pair of entities, and their relationship and each action policy rule expressing an event and one or more actions to be carried out in response to the event. A method according to the invention comprises:

deriving implicit relations between pairs of the entities on the basis of the relation data items, and generating the configuration data for the one or more network elements on the basis of the relation data items, the action policy rules, and the derived implicit relations.

An exemplifying implicit relation can be derived, for example, on the basis of two relation data items, where a first one of the relation data items expresses the relationship between first and second entities and the second one of the relation data items expresses the relationship between the second entity and a third entity. In this exemplifying case, the above-mentioned implicit relation can be set to express that the relationship between the first and third entities is the same as the relationship between the first and second entities. The first one of the relation data items may express e.g. "TCP destination port X is used by a protocol-Y", where "TCP destination port X" and "protocol-Y" are the first and second entities, respectively, and the usage "is used by" is their relationship, and the second one of the relation data items may express e.g. "Subscriber Z uses protocol-Y", where "Subscriber Z" is the third entity and the usage "uses" is the relationship between the second and third entities. In this case, the implicit relation can be "Subscriber Z uses the TCP destination port X".

A method according to an exemplifying and non-limiting embodiment of the invention further comprises deriving implicit action rules on the basis of the relation data items, the action policy rules, and the derived implicit relations. In this exemplifying case, the configuration data for the one or more network elements can be generated on the basis of the relation data items, the action policy rules, the derived implicit relations, and the derived implicit action rules. An exemplifying implicit action rule can be derived, for example, on the basis of an action policy rule and the above-mentioned implicit relation, where the action policy rule expresses a first event related to above-mentioned first entity and at least one first action to be carried out in response to the first event. In this exemplifying case, the above-mentioned implicit action rule can be set to express that the first action is to be carried out in response to an event related to the above-mentioned third entity. The above-mentioned action policy rule can be e.g. "when incoming data has the TCP destination port X then block the incoming data", where the "incoming data has the TCP destination port X" represents the first event related to the first entity and the "block the incoming data" represents the first action. In this case, the implicit action rule can be e.g. "when incoming data belongs to Subscriber Z then block the incoming data", where the "incoming data belongs to Subscriber Z" represents the event related to the third entity "Subscriber Z".

The derivation of the implicit relations and the utilization of the derived implicit relations for deriving the configuration data for the one or more network elements facilitate providing configuration data such that many different circumstances can be handled automatically in an appropriate way once the relation data items and action policy rules have been given as input data. The relation data items and action policy rules are advantageously presented with an Extensible Markup Language "XML" that defines data in a format that is both human-readable and machine-readable. The relation data items can be, for example but not necessarily, presented as triplets "subject entity-predicate-object entity" of the Resource Description Framework "RDF" data model. The triplets can be nested into human readable data presented with the Hypertext Markup Language "HTML". This allows implementing, in a user friendly way, services and operational models not foreseen or planned by the provider of a system for configuring the network elements. The action policy rules can be presented, for example but not necessarily, in a form where each action policy rule contains an event descriptor, an action descriptor, and a condition descriptor, wherein the action description defines one or more actions to be carried out in response to a situation in which an event defined by the event description takes place and every condition defined by the condition descriptor is fulfilled.

In accordance with the invention, there is provided also a new controller device for configuring one or more network elements of a software-defined network. A controller device according to the invention comprises:
  a data interface for receiving relation data items and action policy rules, each relation data item expressing a pair of entities and their relationship and each action policy rule expressing an event and one or more actions to be carried out in response to the event, and
  a processor for generating configuration data for the one or more network elements,
wherein the processor is configured to:
  derive implicit relations between pairs of the entities on the basis of the relation data items, and
  generate the configuration data for the one or more network elements on the basis of the relation data items, the action policy rules, and the derived implicit relations.

In accordance with the invention, there is provided also a new software-defined network that comprises:
  one or more network elements, and
  a controller device for transmitting configuration data to the one or more network elements so as to configure the one or more network elements,
wherein the controller device comprises:
  a data interface for receiving relation data items and action policy rules, each relation data item expressing a pair of entities and their relationship and each action policy rule expressing an event and one or more actions to be carried out in response to the event, and
  a processor configured to:
    derive implicit relations between pairs of the entities on the basis of the relation data items, and
    generate configuration data for the one or more network elements on the basis of the relation data items, the action policy rules, and the derived implicit relations.

In accordance with the invention, there is provided also a new computer program for configuring one or more network elements of a software-defined network on the basis of relation data items and action policy rules, each relation data item expressing a pair of entities and their relationship and each action policy rule expressing an event and one or more actions to be carried out in response to the event. A computer program according to the invention comprises computer executable instructions for controlling a programmable processor to:
  derive implicit relations between pairs of the entities on the basis of the relation data items, and
  generate configuration data for the one or more network elements on the basis of the relation data items, the action policy rules, and the derived implicit relations.

In accordance with the invention, there is provided also a new computer program product. The computer program product comprises a non-volatile computer readable medium, e.g. a compact disc "CD", encoded with a computer program according to the invention.

A number of exemplifying embodiments of the invention are described in accompanied dependent claims.

Various exemplifying embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in depending claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which.

DESCRIPTION OF EXEMPLIFYING EMBODIMENTS

Figure 1:
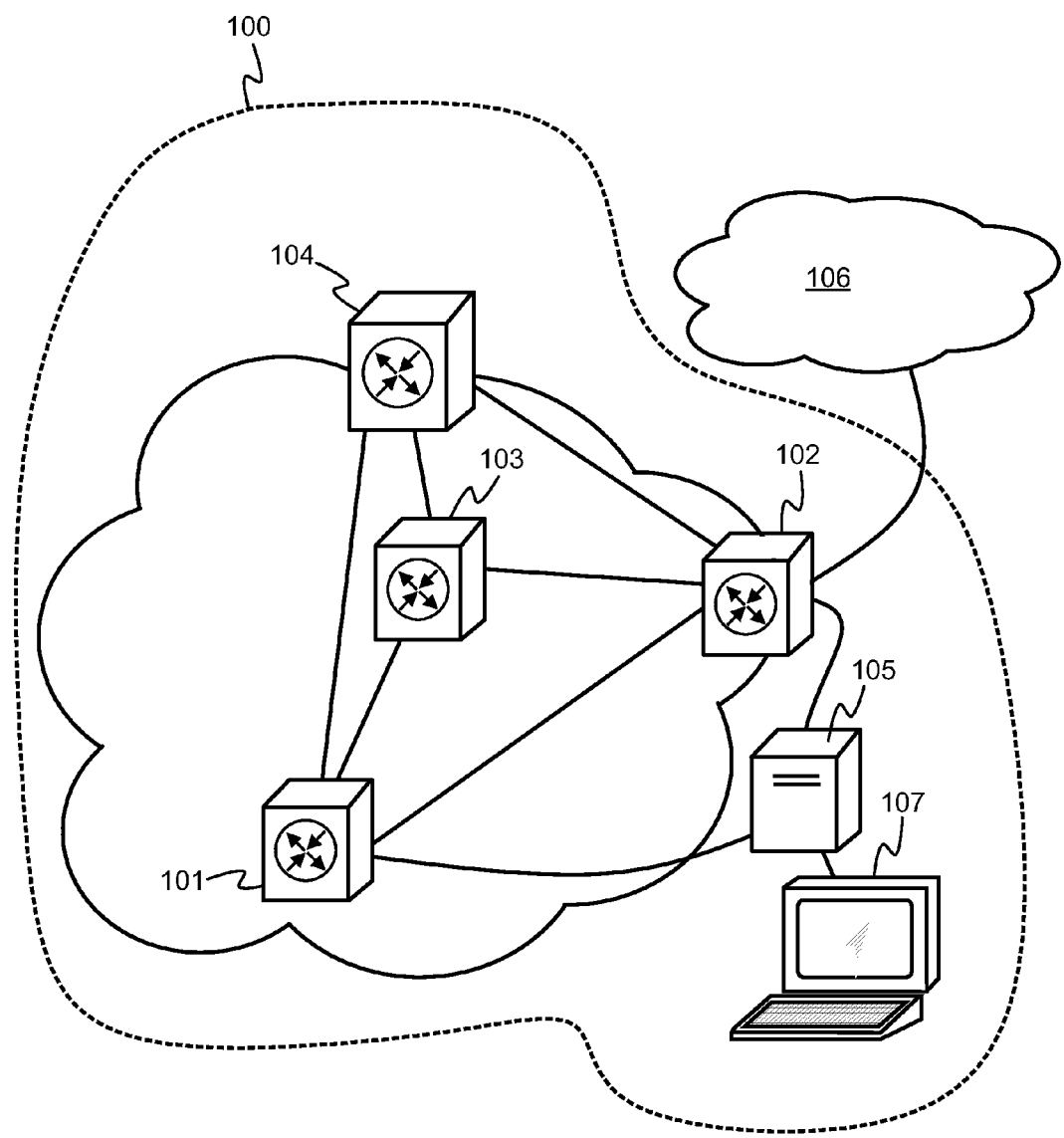
FIG. 1 shows a schematic illustration of a software-defined network according to an exemplifying embodiment of the invention.

FIG. 1 shows a schematic illustration of a software-defined network "SDN" 100 according to an exemplifying embodiment of the invention. The software-defined network comprises network elements 101, 102, 103, and 104 and a controller device 105. The network elements 101-104 are mutually interconnected with data transfer links as illustrated in FIG. 1. The network elements may be e.g. IP (Internet Protocol) routers, multiprotocol label switching "MPLS" nodes, and/or Ethernet switches. Each network element may consist of a single apparatus or a combination of a plurality of apparatuses. In the exemplifying case illustrated in FIG. 1, a terminal device 107 is connected to the controller device 105 and the network element 102 acts as a gateway to an external network 106 that can be e.g. the global Internet. The controller device 105 comprises a data interface for receiving relation data items and action policy rules. Each relation data item expresses a pair of entities and the relationship between the entities and each action policy rule expresses an event and one or more actions to be carried out in response to the event. Each relation data item can be presented as a triplet comprising a subject entity, a predicate, and an object entity, wherein the subject and the object entities constitute the pair of entities and the predicate expresses their mutual relationship. For example, a relation data item can be "the Secure Shell "SSH" protocol uses TCP destination port 22", where "SSH-protocol" is the subject entity, the "uses" is the predicate, and the "TCP destination port 22" is the object entity. Another example for a relation data item is "Subscriber S uses the SSH-protocol", where "Subscriber S" is the subject entity, the "uses" is the predicate, and the "SSH-protocol" is the object entity. Each action policy rule can be presented as a duplet comprising an event descriptor and an action descriptor indicating one or more actions to be carried out in response to the event. For example, an action policy rule can be "when incoming data represents the SSH-protocol then block the incoming data", where the "incoming data represents the SSH-protocol" is the event descriptor and the "block the incoming data" is the action descriptor.

The controller device 105 comprises a processor configured to derive implicit relations between pairs of the entities on the basis of the relation data items. An implicit relation can be derived by chaining two or more relation data items so that the object entity of a relation data item is the subject entity of the next relation data item. The subject entity of the first relation data item in the chain is the subject entity of the derived implicit relation and the object entity of the last relation data item in the chain is the object entity of the implicit relation. The predicate of the implicit relation is typically the predicate of the first relation data item in the chain. For example, in the above mentioned exemplifying case, the object entity of the relation data item "Subscriber S uses the SSH-protocol" is the subject entity of the relation data item "the SSH-protocol uses TCP destination port 22". Hence, the implicit relation is "Subscriber S uses TCP destination port 22".

In a software-defined network according to an exemplifying embodiment of the invention, the processor of the controller device 105 is further configured to derive implicit action rules on the basis of the relation data items, the action policy rules, and the derived implicit relations. An implicit action rule can be derived on the basis of an action policy rule whose event descriptor comprises a subject entity of a relation data item or an implicit relation. The object entity of the relation data item or the implicit relation constitutes a basis of the event descriptor of the implicit action rule, and the action descriptor of the action policy rule constitutes the action descriptor of the implicit action rule. For example, in the above mentioned exemplifying case, the subject entity of the relation data item "the SSH-protocol uses TCP destination port 22" is comprised by the event descriptor of the action policy rule "when incoming data represents the SSH-protocol then block the incoming data". This leads to the following implicit action rule: "when incoming data has TCP destination port 22 then block the incoming data". An implicit action rule can be derived also on the basis of an action policy rule whose event descriptor comprises an object entity of a relation data item or an implicit relation. In this case, the subject entity of the relation data item or the implicit relation constitutes a basis of the event descriptor of the implicit action rule, and the action descriptor of the action policy rule constitutes the action descriptor of the implicit action rule. For example, the object entity of the above-derived implicit relation "Subscriber S uses TCP destination port 22" is comprised by the event descriptor of the above-derived implicit action rule "when incoming data has TCP destination port 22 then block the incoming data". This leads to the following new implicit action rule: "when incoming data represents the Subscriber S then block the incoming data". The above-presented exemplifying case illustrated that earlier derived implicit action rules can be used for deriving new implicit action rules. The derivation of the implicit relations and utilization of the derived implicit relations for deriving the implicit action rules facilitates providing automated operation once appropriate relation data items and action policy rules are available to the controller device 105.

The processor of the controller device 105 is further configured to generate network level configuration data for the software-defined network "SDN" 100 on the basis of the relation data items, the action policy rules, and the derived implicit relations. In a software-defined network according to an exemplifying embodiment of the invention, the processor of the controller device 105 is configured to use also the above-mentioned implicit action rules as the basis of the network level configuration data. Furthermore, the processor of the controller device 105 is configured to generate network element specific configuration data on the basis of the network level configuration data. The network level configuration data indicates actions to be done in response to different events in the software-defined network "SDN" 100. The configuration data of a given network element indicates actions to be done by the network element under consideration in response to different events which take place in this network element or which are otherwise known by this network element. The controller device 105 is preferably configured to transmit the configuration data of each of the network elements 101-104 to the appropriate network element via a direct data transfer link or via one or more other network elements.

In a software-defined network according to an exemplifying embodiment of the invention, the processor of the controller device 105 is configured to resolve, in conjunction with the derivation of the implicit action rules, conflicts between mutually conflicting action policy rules on the basis of conflict resolving rules indicating mutual priorities of the action policy rules.

In a software-defined network according to an exemplifying embodiment of the invention, the processor of the controller device 105 is configured to resolve, in conjunction with the generation of the configuration data, conflicts between mutually conflicting action policy rules on the basis of the conflict resolving rules indicating the mutual priorities of the action policy rules.

In a software-defined network according to an exemplifying embodiment of the invention, the controller device 105 is configured to use the OpenFlow as a communication method for the control plane of the software-defined network to communicate with the data plane of the software-defined network. In this case, the OpenFlow can be used for communicating the configuration data to the one or more network elements. The OpenFlow is managed by the Open Networking Foundation "ONF".

Figure 2:
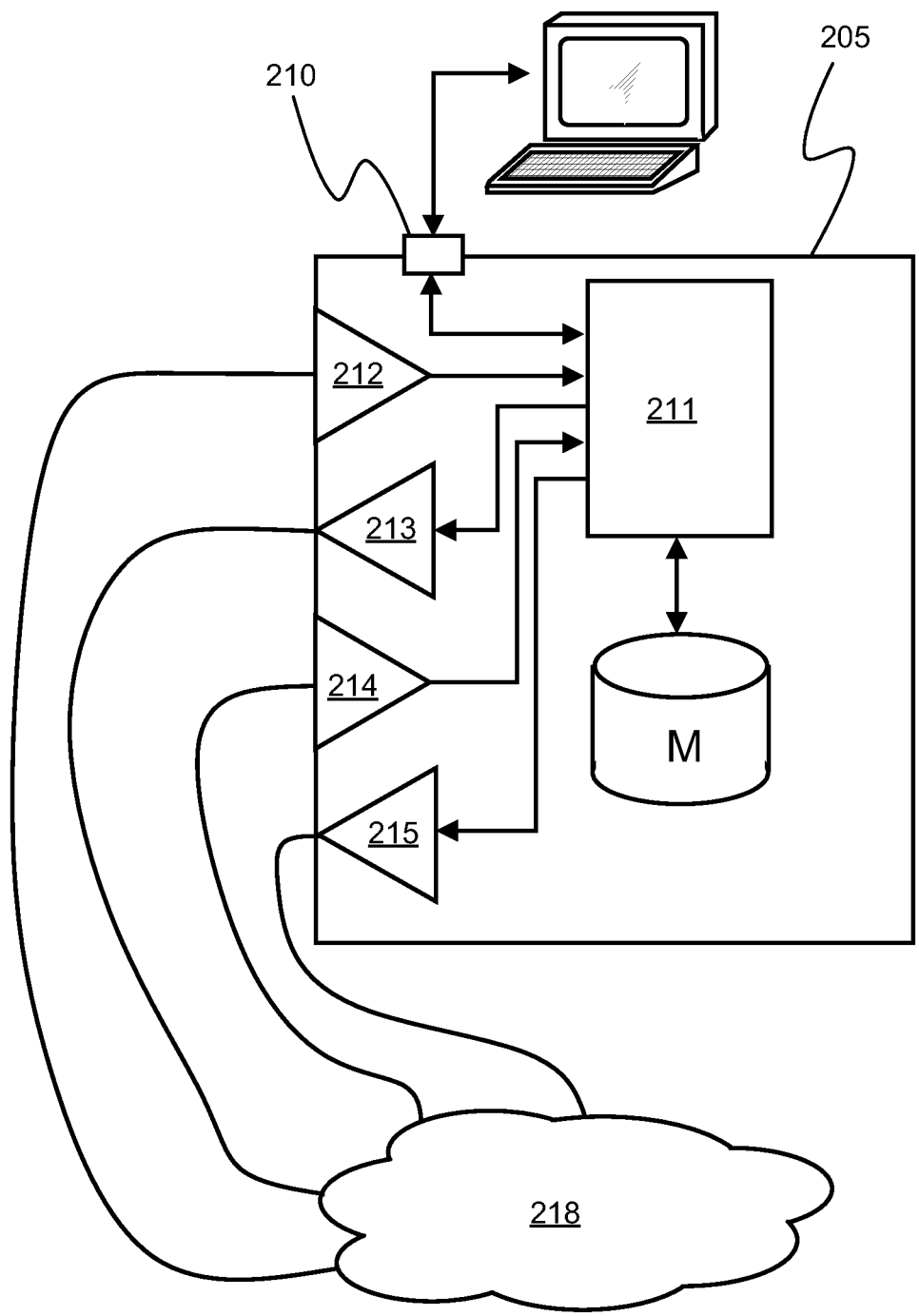
FIG. 2 shows a schematic illustration of controller device according to an exemplifying embodiment of the invention.

FIG. 2 shows a schematic illustration of controller device 205 according to exemplifying embodiments of the invention. The controller device comprises a data interface 210 for receiving relation data items and action policy rules. Each relation data item expresses a pair of entities and their relationship and each action policy rule expresses an event and one or more actions to be carried out in response to the event. The controller device comprises a processor 211 for generating configuration data for one or more network elements of a network 218. The processor 211 is configured to:

derive implicit relations between pairs of the entities on the basis of the relation data items, and generate the configuration data for the one or more network elements on the basis of the relation data items, the action policy rules, and the derived implicit relations.

The controller device 205 may further comprise transmitters 213, 215 and receivers 212, 214 for establishing data transfer connections to the network 218 and for transmitting the configuration data to the one or more network elements. It is also possible that the controller device 205 is provided with a data interface for connecting to an external device that comprises transmitters and receivers for establishing data transfer connections to the network 218.

In a controller device according to an exemplifying embodiment of the invention, the processor 211 is configured derive implicit action rules on the basis of the relation data items, the action policy rules, and the derived implicit relations, and to generate the configuration data for the one or more network elements on the basis of the relation data items, the action policy rules, the derived implicit relations, and the derived implicit action rules.

In a controller device according to an exemplifying embodiment of the invention, the processor 211 is configured to derive, with the aid of a relation data item or an implicit relation, at least one of the implicit action rules from another implicit action rule that has been derived earlier.

In a controller device according to an exemplifying embodiment of the invention, the processor 211 is configured to resolve, in conjunction with the derivation of the implicit action rules, conflicts between mutually conflicting action policy rules on the basis of conflict resolving rules indicating mutual priorities of the action policy rules.

In a controller device according to an exemplifying embodiment of the invention, the processor 211 is configured to resolve, in conjunction with the generation of the configuration data, conflicts between mutually conflicting action policy rules on the basis of the conflict resolving rules indicating the mutual priorities of the action policy rules.

In a controller device according to an exemplifying embodiment of the invention, the processor 211 is configured to derive an implicit relation on the basis of first and second relation data items $R_1$ and $R_2$, where the first relation data item $R_1$ expresses the relationship between first and second entities $E_1$ and $E_2$ and the sec- and relation data item $R_2$ expresses the relationship between the second entity $E_2$ and a third entity $E_3$. In this case, the implicit relation can be set to express the relationship between the first and third entities $E_1$ and $E_3$. The relationship between the first and third entities $E_1$ and $E_3$ can be set to be the same as the relationship between the first and second entities $E_1$ and $E_2$.

In a controller device according to an exemplifying embodiment of the invention, the processor 211 is configured to derive an implicit action rule on the basis of a first action policy rule $AR_1$ and the above-mentioned implicit relation, where the first action policy rule $AR_1$ expresses a first event $EV_1$ and one or more first actions $ACT_1$ to be carried out in response to the first event and the implicit relation expresses the relationship between the first and third entities $E_1$ and $E_3$, where the first entity $E_1$ is related to the first event $EV_1$ and the third entity $E_3$ is related to a third event $EV_3$. In this case, the implicit action rule can be set to express that the one or more first actions $ACT_1$ are to be carried out in response to the third event $EV_3$.

In a controller device according to an exemplifying embodiment of the invention, the data interface 210 is configured to receive the relation data items and the action policy rules in a data-format according to an Extensible Markup Language "XML" that defines data in a form that is both human-readable and machine-readable.

In a controller device according to an exemplifying embodiment of the invention, the data interface 210 is configured to receive the relation data items as triplets of the Resource Description Framework "RDF" data model, each triplet containing a subject entity, an object entity and a predicate defining the relationship between these subject and object entities.

In a controller device according to an exemplifying embodiment of the invention, the processor 211 is configured to construct, for each of the one or more network elements to be configured, a look-up table containing forwarding rules based at least partly on the action policy rules and on the derived implicit action rules, the look-up table representing at least a part of the configuration data for this network element.

In a controller device according to an exemplifying embodiment of the invention, the data interface 210 is configured to receive the action policy rules in a form where each action policy rule contains an event descriptor, an action descriptor, and a condition descriptor, the action description defining one or more actions to be carried out in response to a situation in which an event defined by the event description takes place and every condition defined by the condition descriptor is fulfilled.

A controller device according to an exemplifying embodiment of the invention is configured to use the OpenFlow as a communication method for the control plane of the software-defined network to communicate with the data plane of the software-defined network. In this case, the OpenFlow can be used for communicating the configuration data to the one or more network elements.

The processor 211 of the controller device shown in FIG. 2 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
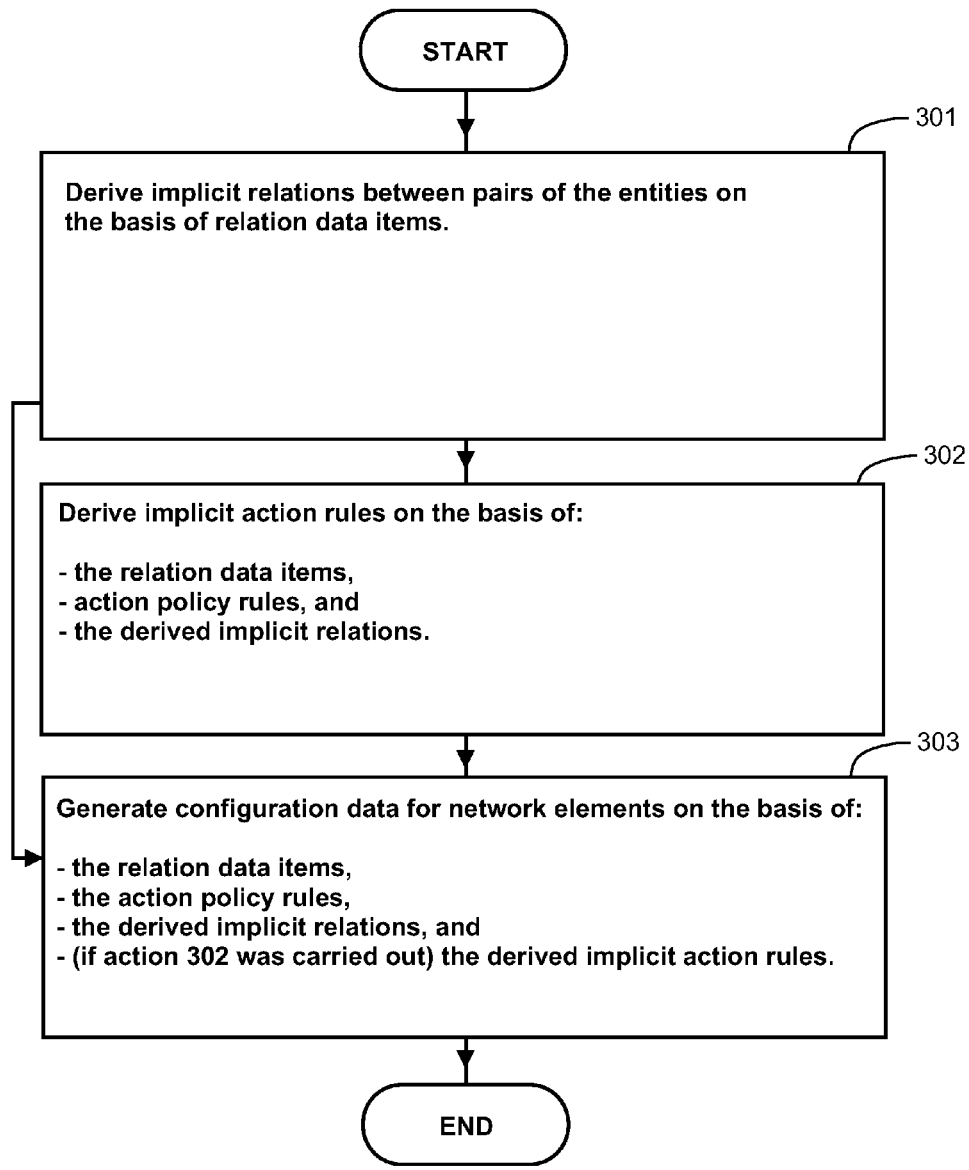
FIG. 3 shows a flow chart of a method according to an exemplifying embodiment of the invention for configuring one or more network elements of a software-defined network.

FIG. 3 shows a flow chart of a method according to an exemplifying embodiment of the invention for configuring one or more network elements of a software-defined network on the basis of relation data items and action policy rules, each relation data item expressing a pair of entities and their relationship and each action policy rule expressing an event and one or more actions to be carried out in response to the event. The method illustrated in FIG. 3 comprises the following actions:

action 301: deriving implicit relations between pairs of the entities on the basis of the relation data items, and action 303: generating configuration data for the one or more network elements on the basis of the relation data items, the action policy rules, and the derived implicit relations.

Furthermore, the method may comprise transmitting the configuration data to the one or more network elements via data transfer links of the software-defined network. For example, the OpenFlow can be used as a communication method for the control plane of the software-defined network to communicate with the data plane of the software-defined network. In this case, the OpenFlow can be used for communicating the configuration data to the one or more network elements.

A method according to an exemplifying embodiment of the invention comprises deriving implicit action rules on the basis of the relation data items, the action policy rules, and the derived implicit relations. The derivation of the implicit action rules is the action 302 shown in FIG. 3. In this exemplifying case, the configuration data for the one or more network elements is generated on the basis of the relation data items, the action policy rules, the derived implicit relations, and the derived implicit action rules.

A method according to an exemplifying embodiment of the invention comprises deriving, with the aid of a relation data item or an implicit relation, at least one of the implicit action rules from another implicit action rule that has been derived earlier.

A method according to an exemplifying embodiment of the invention comprises resolving, in conjunction with the derivation of the implicit action rules, conflicts between mutually conflicting action policy rules on the basis of conflict resolving rules indicating mutual priorities of the action policy rules.

A method according to an exemplifying embodiment of the invention comprises resolving, in conjunction with the generation of the configuration data, conflicts between mutually conflicting action policy rules on the basis of the conflict resolving rules indicating the mutual priorities of the action policy rules.

In a method according to an exemplifying embodiment of the invention, an implicit relation is derived on the basis of first and second relation data items $R_1$ and $R_2$, where the first relation data item $R_1$ expresses the relationship between first and second entities $E_1$ and $E_2$ and the second relation data item $R_2$ expresses the relationship between the second entity $E_2$ and a third entity $E_3$. In this case, the implicit relation can be set to express the relationship between the first and third entities $E_1$ and $E_3$. The relationship between the first and third entities $E_1$ and $E_3$ can be set to be the same as the relationship between the first and second entities $E_1$ and $E_2$.

In a method according to an exemplifying embodiment of the invention, an implicit action rule is derived on the basis of a first action policy rule $AR_1$ and the above-mentioned implicit relation, where the first action policy rule $AR_1$ expresses a first event $EV_1$ and one or more first actions $ACT_1$ to be carried out in response to the first event and the implicit relation expresses the relationship between the first and third entities $E_1$ and $E_3$, where the first entity $E_1$ is related to the first event $EV_1$ and the third entity $E_3$ is related to a third event $EV_3$. In this case, the implicit action rule can be set to express that the one or more first actions $ACT_1$ are to be carried out in response to the third event $EV_3$.

In a method according to an exemplifying embodiment of the invention, the relation data items and action policy rules are received in a data-format according to an Extensible Markup Language "XML" that defines data in a form that is both human-readable and machine-readable.

In a method according to an exemplifying embodiment of the invention, the relation data items are triplets of the Resource Description Framework "RDF" data model, each triplet containing a subject entity and an object entity defining the pair of entities and a predicate defining the relationship between these subject and object entities.

A method according to an exemplifying embodiment of the invention comprises constructing, for each of the one or more network elements to be configured, a look-up table containing forwarding rules based at least partly on the action policy rules and on the derived implicit action rules, the look-up table representing at least a part of the configuration data for this network element.

In a method according to an exemplifying embodiment of the invention, each of the action policy rules contains an event descriptor, an action descriptor, and a condition descriptor, the action description defining one or more actions to be carried out in response to a situation in which an event defined by the event description takes place and every condition defined by the condition descriptor is fulfilled.

A computer program according to an exemplifying embodiment of the invention comprises software modules for configuring one or more network elements of a software-defined network on the basis of relation data items and action policy rules, each relation data item expressing a pair of entities and their relationship and each action policy rule expressing an event and one or more actions to be carried out in response to the event. The software modules comprise computer executable instructions for controlling a programmable processor to:

derive implicit relations between pairs of the entities on the basis of the relation data items, and generate configuration data for the one or more network elements on the basis of the relation data items, the action policy rules, and the derived implicit relations.

In a computer program according to an exemplifying embodiment of the invention, the software modules further comprise computer executable instructions for controlling the programmable processor to derive implicit action rules on the basis of the relation data items, the action policy rules, and the derived implicit relations, and to generate the configuration data for the one or more network elements on the basis of the relation data items, the action policy rules, the derived implicit relations, and the derived implicit action rules.

The software modules can be e.g. subroutines or functions implemented with a suitable programming language and with a compiler suitable for the programming language and the programmable processor.

A computer program product according to an exemplifying embodiment of the invention comprises a computer readable medium, e.g. a compact disc ("CD"), encoded with a computer program according to an exemplifying embodiment of invention.

A signal according to an exemplifying embodiment of the invention is encoded to carry information defining a computer program according to an exemplifying embodiment of invention.

The specific examples provided in the description given above should not be construed as limiting the scope and/or the applicability of the appended claims.

What is claimed is:

1. A controller device for configuring one or more network elements of a software-defined network, the controller device comprising:
   a data interface that receives relation data items and action policy rules, each relation data item expressing a pair of entities of the network and a relationship between the entities, and each action policy rule expressing a network-related event and one or more network-related actions to be carried out in response to the event;
   a network interface that transmits and receives data to and from the network; and
      a processor that generates configuration data for the one or more network elements,
   wherein the processor is configured to:
      derive and store implicit relation data items expressing implicit relations between pairs of the entities on the basis of the received relation data items,
         whereby a first one of the implicit relations is derived using a combination of first and second ones of the relation data items,
         the first one of the relation data items expressing a relationship between first and second ones of the entities,
         the second one of the relation data items expressing a relationship between the second one and a third one of the entities, and
         the first one of the implicit relations being derived such to express a relationship between the first and third ones of the entities,
      generate and store the configuration data for the one or more network elements on the basis of the relation data items, the action policy rules, and the derived implicit relations, and
   cause the network interface to transmit, as network data receivable and operable by the one or more network elements, the configuration data to the one or more network elements.

2. The controller device according to claim 1, wherein the processor is configured derive and store implicit action data expressing implicit action rules on the basis of the relation data items, the action policy rules, and the derived implicit relations, and to generate and store the configuration data for the one or more network elements on the basis of the relation data items, the action policy rules, the derived implicit relations, and the derived implicit action rules.

3. The controller device according to claim 2, wherein the processor is further configured to resolve, in conjunction with derivation of the implicit action rules, conflicts between mutually conflicting action policy rules on the basis of conflict resolving rules indicating mutual priorities of the action policy rules.

4. The controller device according to claim 1, wherein the processor is further configured to resolve, in conjunction with generation of the configuration data, conflicts between mutually conflicting action policy rules on the basis of the conflict resolving rules indicating the mutual priorities of the action policy rules.

5. The controller device according to claim 2, wherein the processor is configured to derive and store a first one of the implicit action rules on the basis of a first one of the action policy rules and a first one of the implicit relations, the first one of the action policy rules expressing a first event and one or more first actions to be carried out in response to the first event, the first one of the implicit relations expressing a relationship between a first one of the entities and a second one of the entities, where the first one of the entities is related to the first event and the second one of the entities is related to a second event, and the first one of the implicit action rules expressing that the one or more first actions are to be carried out in response to the second event.

6. The controller device according to claim 1, wherein the processor is configured to derive and store a first one of the implicit action rules on the basis of a first one of the action policy rules and the first one of the implicit relations, the first one of the action policy rules expressing a first event and one or more first actions to be carried out in response to the first event, the first one of the implicit relations expressing a relationship between the first one of the entities and the third one of the entities, where the first one of the entities is related to the first event and the third one of the entities is related to a third event, and the first one of the implicit action rules expressing that the one or more first actions are to be carried out in response to the third event.

7. The controller device according to claim 1, wherein the processor is configured to set the relationship between the first and third ones of the entities and expressed by the first one of the implicit relations to be the same as the relationship between the first and second ones of the entities and expressed by the first one of the relation data items.

8. The controller device according to claim 1, wherein the data interface is configured to receive the relation data items and action policy rules in a data-format according to an Extensible Markup Language that defines data in a form that is both human-readable and machine-readable.

9. The controller device according to claim 1, wherein the data interface is configured to receive the relation data items as triplets of a Resource Description Framework data model, each triplet containing a subject entity and an object entity defining the pair of entities and a predicate defining the relationship between these subject and object entities.

10. The controller device according to claim 1, wherein the processor is configured to construct and store, for each of the one or more network elements to be configured, a look-up table containing forwarding rules based at least partly on the action policy rules, the look-up table representing at least a part of the configuration data for this network element.

11. The controller device according to claim 2, wherein the processor is configured to construct and store, for each of the one or more network elements to be configured, a look-up table containing forwarding rules based at least partly on the action policy rules and on the derived implicit action rules, the look-up table representing at least a part of the configuration data for this network element.

12. The controller device according to claim 1, wherein the data interface is configured to receive the action policy rules in a form where each action policy rule contains an event descriptor, an action descriptor, and a condition descriptor, the action description defining one or more actions to be carried out in response to a situation in which an event defined by the event description takes place and every condition defined by the condition descriptor is fulfilled.

13. The controller device according to claim 2, wherein the processor is configured to derive and store at least one of the implicit action rules from another, earlier-derived implicit action rule.

14. A method for configuring one or more network elements of a software-defined network on the basis of relation data items and action policy rules, each relation data item expressing a pair of entities of the network and a relationship between the entities, and each action policy rule expressing a network-related event and one or more network-related actions to be carried out in response to the event, the method comprising:
receiving and storing, at a controller device, the relation data items;
at the controller device, using the relation data items to derive and store implicit relation data items expressing implicit relations between pairs of the entities, whereby a first one of the implicit relations is derived
on the basis of first and second ones of the relation data items,
the first one of the relation data items expressing a relationship between first and second ones of the entities,
the second one of the relation data items expressing a relationship between the second one and a third one of the entities, and
the first one of the implicit relations expressing a relationship between the first and third ones of the entities;
generating and storing, at the controller, the configuration data on the basis of the relation data items, the action policy rules, and the derived implicit relations; and
at the controller, transmitting, as network data receivable and operable by the one or more network elements, the configuration data to the one or more network elements.

15. The method according to claim 14, wherein the method further comprises deriving and storing implicit action data expressing implicit action rules on the basis of the relation data items, the action policy rules, and the derived implicit relations, and generating and storing the configuration data for the one or more network elements on the basis of the relation data items, the action policy rules, the derived implicit relations, and the derived implicit action rules.

16. The method according to claim 15, further comprising:
resolving, in conjunction with the derivation of the implicit action rules, conflicts between mutually conflicting action policy rules on the basis of conflict resolving rules indicating mutual priorities of the action policy rules.

17. A computer program product, comprising a non-transitory computer readable medium encoded with a computer program for configuring one or more network elements of a software-defined network on the basis of relation data items and action policy rules, each relation data item expressing a pair of entities of the network and a relationship between the entities, and each action policy rule expressing a network-related and one or more network-related actions to be carried out in response to the event, the computer program comprising computer executable instructions that, upon execution by a programmable processor, causes the programmable processor to:
receive and store, via a data interface, the relation data items;
derive and store implicit relation data items that express implicit relations between pairs of the entities, on the basis of the relation data items,
whereby a first one of the implicit relations is derived on the basis of first and second ones of the relation data items,
the first one of the relation data items expressing a relationship between first and second ones of the entities,
the second one of the relation data items expressing a relationship between the second one and a third one of the entities, and
the first one of the implicit relations expressing a relationship between the first and third ones of the entities;
generate and store configuration data for the one or more network elements on the basis of the relation data items, the action policy rules, and the derived implicit relation; and
via a network interface, transmit, as network data receivable and operable by the one or more network elements, the configuration data to the one or more network elements.

18. A communications network, comprising:
one or more network devices; and
a controller device for transmitting configuration data to the one or more network devices so as to configure the one or more network devices,
wherein the controller device comprises:
a data interface that receives relation data items and action policy rules, each relation data item expressing a pair of entities of the network and a relationship between the entities, and each action policy rule expressing a network-related event and one or more network-related actions to be carried out in response to the event;
a network interface that transmits and receives data to and from the network; and
a processor that generates the configuration data for the one or more network devices, and
wherein the processor of the controller device is configured to:
derive and store implicit relation data items expressing implicit relations between pairs of the entities on the basis of the received relation data items,
whereby a first one of the implicit relations is derived on the basis of first and second ones of the relation data items,
the first one of the relation data items expressing a relationship between first and second ones of the entities,
the second one of the relation data items expressing a relationship between the second one and a third one of the entities, and
the first one of the implicit relations expressing a relationship between the first and third ones of the entities,
generate and store the configuration data for the one or more network devices on the basis of the relation data items, the action policy rules, and the derived implicit relations, and
cause the network interface to transmit, as network data receivable and operable by the one or more network elements, the configuration data to the one or more network devices.

19. The communications network according to claim 18, wherein the controller device is configured to use Open-Flow-based protocol as a communication method for a control plane of the network to communicate with a data plane of the network.

\* \* \* \* \*